(12) United States Patent
Morrow

(10) Patent No.: US 6,442,888 B1
(45) Date of Patent: Sep. 3, 2002

(54) ADJUSTABLE AERATOR FOR FITTING DIFFERENT SIZED LIVE BAIT WELLS

(76) Inventor: Bobby Morrow, 1018 Trout, Port Isabel, TX (US) 78578-2522

( * ) Notice: Subject to any disclaimer, the term of this patent is extended or adjusted under 35 U.S.C. 154(b) by 0 days.

(21) Appl. No.: 09/966,296

(22) Filed: Sep. 28, 2001

(51) Int. Cl.[7] ............................................. A01K 97/00
(52) U.S. Cl. ............................................. 43/57; 43/55
(58) Field of Search ...................................... 43/55, 57

(56) References Cited

U.S. PATENT DOCUMENTS

| | | | |
|---|---|---|---|
| 4,255,360 A | 3/1981 | Jeffries | 261/5 |
| 4,936,043 A | 6/1990 | Steele | 43/57 |
| 4,994,177 A | 2/1991 | Bogar, Jr. | 210/167 |
| 5,275,762 A | 1/1994 | Burgess | 261/4 |
| 5,582,777 A | 12/1996 | Vento | 261/93 |
| 5,822,916 A | 10/1998 | Power | 43/57 |

*Primary Examiner*—Charles T. Jordan
*Assistant Examiner*—Danielle Rosenthal
(74) *Attorney, Agent, or Firm*—Richard L. Miller

(57) ABSTRACT

An adjustable aerator for fitting different sized live bait wells. The aerator includes a plate that is vertically positioned in the live bait well, a pump, and a manifold in fluid communication with the pump. The pump is attached to the base of the live bait well by suction cups and aerates water passing through the plate. The manifold conducts the water after being aerated by the pump and includes a lower elbow in fluid communication with the pump, an upright tube in fluid communication with the lower elbow, a TEE in fluid communication with the upright tube, a pair of transverse tubes in fluid communication with both sides of the TEE, respectively, and a pair of upper elbows in fluid communication with the pair of transverse tubes, respectively, and rotatably attached to the pair of transverse tubes, respectively, so as to accommodate for the different sized live bait wells.

15 Claims, 1 Drawing Sheet

ADJUSTABLE AERATOR FOR FITTING DIFFERENT SIZED LIVE BAIT WELLS

BACKGROUND OF THE INVENTION

1. Field of the Invention

The present invention relates to an aerator for a live bait well. More particularly, the present invention relates to an adjustable aerator for fitting different sized live bait wells.

2. Description of the Prior Art

Numerous innovations for aerators have been provided in the prior art that will be described. Even though these innovations may be suitable for the specific individual purposes to which they address, however, they differ from the present invention.

A FIRST EXAMPLE, U.S. Pat. No. 4,255,360 to Jeffries teaches a live bait water aerator that comprises a submersible water pump, a conduit attached to the water outlet of the pump, leading vertically upward above the water surface, ending in a water delivery head having a plurality of deliver holes set at an angle relative to the surface of the water. A method of aerating water in a live bait container which comprises drawing water through a three-chambered submergible electrically powered water pump, passing the water through a conduit ending above the surface of the water, delivering a plurality of streams of water through a cylindrical deliver head onto and below the surface of the water in which the pump is submerged thereby trapping air bubbles below the surface of the water.

A SECOND EXAMPLE, U.S. Pat. No. 4,936,043 to Steele teaches a bait container in the form of a foamed plastic chest and lid. A solar cell assembly is positioned on the lid; conductors extend to the lid to metal foil contact strips on the nether side of the lid. A pair of matching metal strips for contact purposes is located on the upper peripheral lip of the chest. The metal contacts connect with conductors to a motor and the motor connects with a pump to remove pump from the chest, to pump the water through a feedline and into a header to be sprayed into the chest.

A THIRD EXAMPLE, U.S. Pat. No. 4,994,177 to Bogar Jr. teaches a bucket-type shaped container including a removable top and downwardly facing suction cups is provided for disposition within and suction cup support from the bottom of a reservoir containing water and bait. The side walls of the container include a large number of water inlet openings formed therein and a flexible panel of filtering material is formed into generally cylindrical configuration and snugly telescoped within the container. A flexible resilient panel member is flexed into generally cylindrical configuration with overlapped ends and is telescoped into the cylindrical filter panel and includes openings formed therethrough registered with the container wall openings, the flexible panel member exerting an outward biasing force on the filter panel. An electric motor powered submersible pump is wholly contained within the container and includes an inlet within the container and an outlet conduit which extends outwardly of the container and includes an outlet end within the associated receptacle above the water level therein and equipped with water spread discharge structure for discharging jets of water therefrom downwardly onto the surface of the water within the receptacle exteriorly of the container.

A FOURTH EXAMPLE, U.S. Pat. No. 5,275,762 to Burgess teaches an aerator that comprises a centrifugal pump including a rotary impeller with a plurality of blades defining an upwardly opening, axially oriented eye, inwardly of the inner ends of the blades, the blades also defining a plurality of flow passages therebetween extending generally radially outwardly from the eye. The pump further comprises an impeller housing generally surrounding the impeller and including an upper wall closely overlaying a major portion of the blades, radially outermost, and defining an axially upwardly opening inlet over the impeller eye, the housing further defining at least one laterally opening outlet communicating with the radially outer extremities of the flow passages. The housing is adapted to resist rotation with respect to a container of liquid in which a pump may be disposed. The pump is also adapted to stay in a given depth range in such container. A housing extension conduit, fixed with respect to the impeller housing, extends upwardly with respect to the impeller housing. A throughway of the conduit has its lower end aligned with the inlet of the impeller housing. The length of the conduit is sufficient to position an upper end of the throughway above the liquid. A lower portion of the conduit at least partially defines a liquid intake disposed below the surface of the liquid and opening above the upper wall of the impeller housing. This liquid intake is sized to pass less liquid per unit time than the pump can handle.

A FIFTH EXAMPLE, U.S. Pat. No. 5,582,777 to Vento teaches an aerator designed for aeration of a live bait well and comprising a centrifugal type pump comprising an impeller and an impeller casing having an inlet an outlet, wherein the inlet is in communication with water from the bait well and also with air via an air conduit. The air conduit is provided with metering means for metering the amount of air entering the impeller and for optimizing the mincing of air in the fluid (which is a different technical phenomena from simply pumping an air/water mixture). The bubble produced in accordance with the present invention are so fine as to give the water a fogged appearance. The unusually high level of oxygenation makes it possible for the first time to pack two to four times as many bait fish into a live well as had previously been considered possible.

A SIXTH EXAMPLE, U.S. Pat. No. 5,822,916 to Power teaches a battery operated storage container which is divided into two compartments, one for bait and a second for fish caught. It incorporates a pump for filling the compartments to a present level and a pump to empty the compartments. It also contains an electronic control panel which allows the user to select which functions he/she wants to perform. These functions include filling, emptying, recycling, and aerating the water. The functions can be performed simultaneously or independently.

It is apparent that numerous innovations for aerators have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide an adjustable aerator for fitting different sized live bait wells that avoids the disadvantages of the prior art.

ANOTHER OBJECT of the present invention is to provide an adjustable aerator for fitting different sized live bait wells that is simple and inexpensive to manufacture.

STILL ANOTHER OBJECT of the present invention is to provide an adjustable aerator for fitting different sized live bait wells that is simple to use.

BRIEFLY STATED, STILL YET ANOTHER OBJECT of the present invention is to provide an adjustable aerator for fitting different sized live bait wells. The aerator includes a plate that is vertically positioned in the live bait well, a pump, and a manifold in fluid communication with the pump. The pump is attached to the base of the live bait well by suction cups and aerates water passing through the plate. The manifold conducts the water after being aerated by the pump and includes a lower elbow in fluid communication with the pump, an upright tube in fluid communication with the lower elbow, a TEE in fluid communication with the upright tube, a pair of transverse tubes in fluid communication with both sides of the TEE, respectively, and a pair of upper elbows in fluid communication with the pair of transverse tubes, respectively, and rotatably attached to the pair of transverse tubes, respectively, for accommodating for the different sized live bait wells.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawings.

BRIEF DESCRIPTION OF THE DRAWING

The figures of the drawing are briefly described as follows.

Figure 1:
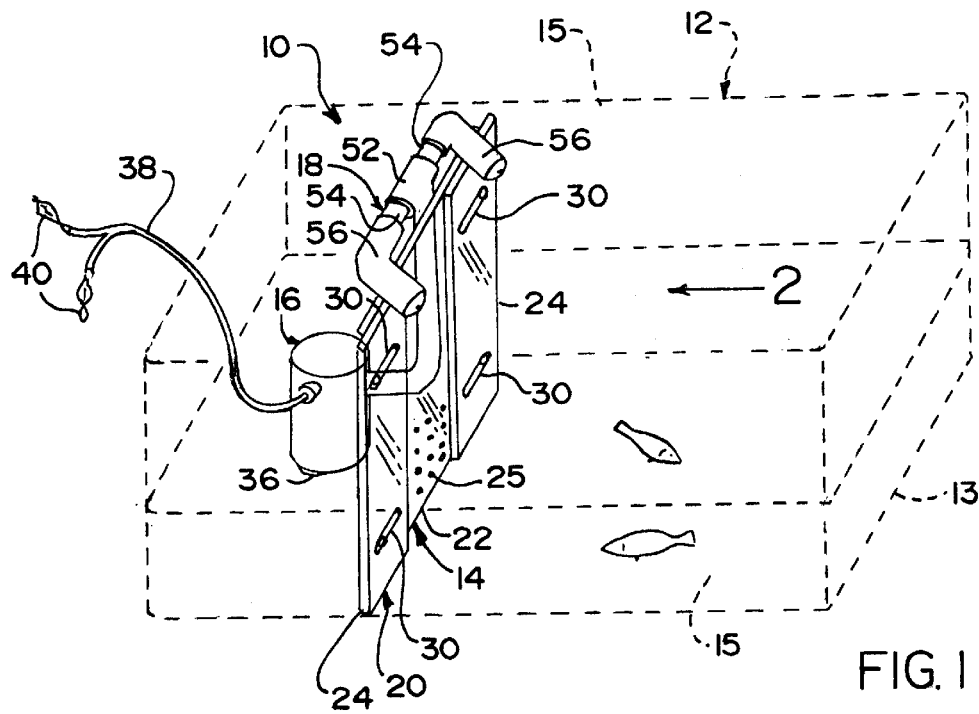
FIG. 1 is a diagrammatic perspective view of the present invention in use.

LIST OF REFERENCE NUMERALS UTILIZED IN THE DRAWING 10 adjustable aerator of present invention for fitting different sized live bait wells 12
12 live bait well
13 base of live bait well 12
14 mount for positioning in live bait well 12
15 pair of side walls of live base well 12
16 pump for mounting on base 13 of live bait well 12
18 manifold
20 plate of mount 14 for vertically positioning in live bait well 12
22 fixed center portion of plate 20 of mount 14
24 pair of movable outer portions of plate 20 of mount 14 for engaging pair of side walls 13 of live bait well 12, respectively
25 plurality of water throughbores in fixed center portion 22 of plate 20 of mount 14 for allowing unaerated water in live bait well 12 to pass therethrough and be aerated
26 four side portion attaching throughbores in fixed center portion 22 of plate 20 of mount 14
28 pair of manifold attaching throughbores in fixed center portion 22 of plate 20 of mount 14
30 pair of attaching throughslots in each side portion of pair of movable outer portions 24 of plate 20 of mount 14
32 four side portion attaching screws of plate 20 of mount 14
34 four wing nuts of plate 20 of mount 14
36 suction cups of pump 16 for engaging base 13 of live bait well 12
38 power cord pump 16
40 alligator clips of power cord 38 of pump 16 for electrically engaging boat battery (not shown)
42 lower elbow of manifold 18
44 upright tube of manifold 18
46 mounting collar of manifold 18
48 pair of screws of manifold 18 passing into mounting collar 46 of manifold 18, then passing into pair of manifold attaching throughbores 28 in fixed center portion 22 of plate 20 of mount 14, respectively, and then threadably engage pair of wing nuts 50 of manifold 18, respectively
50 pair of wing nuts of manifold 18
52 TEE of manifold 18
54 pair of transverse tubes of manifold 18
56 pair of upper elbows of manifold 18

DETAILED DESCRIPTION OF THE PREFERRED EMBODIMENT

Referring now to the figures, in which like numerals indicate like parts, and particularly to FIG. 1, the adjustable aerator of the present invention is shown generally at 10 for fitting different sized live bait wells 12, wherein the live bait well 12 has a base 13 and a pair of side walls 15 that extend upwardly from the base 13 thereof.

Figures 2, 3:
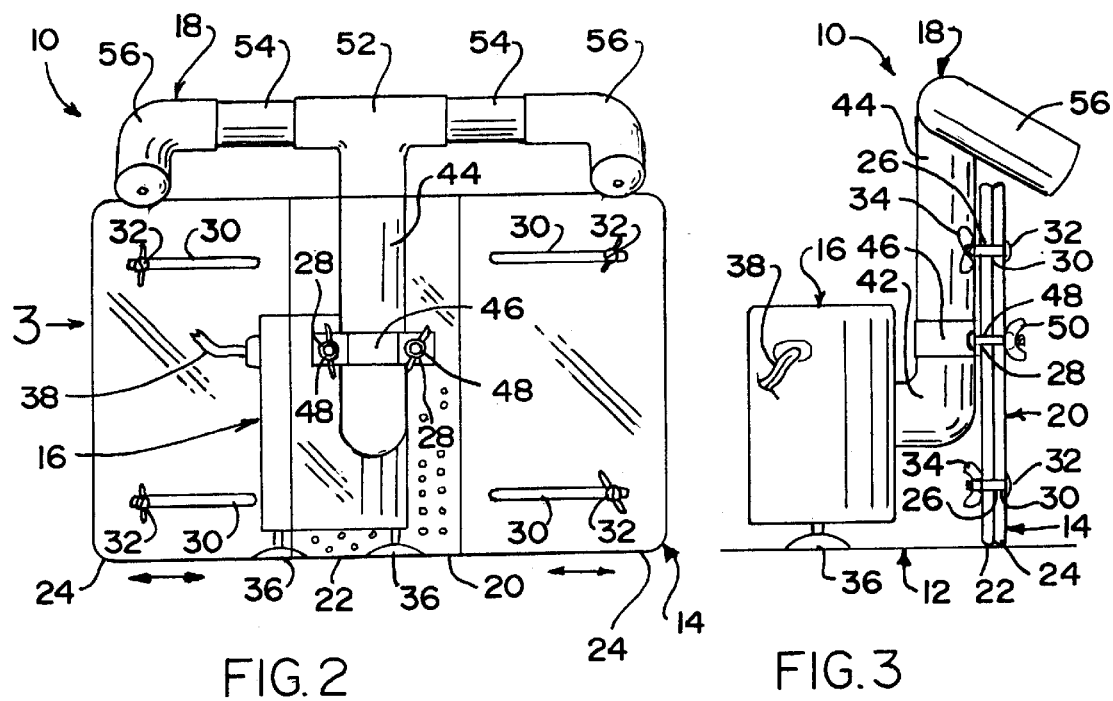
FIG. 2 is an enlarged diagrammatic front elevational view taken generally in the direction of arrow 2 in FIG. 1 of the present invention.
FIG. 3 is a diagrammatic side elevational view taken generally in the direction of arrow 3 in FIG. 2.

The configuration of the adjustable aerator 10 can best be seen in FIGS. 1–3, and as such, will be discussed with reference thereto.

The adjustable aerator 10 comprises a mount 14 for positioning in the live bait well 12, a pump 16 for mounting in the live bait well 12, and a manifold 18 that is in fluid communication with the pump 16 and is attached to the mount 14.

The mount 14 is a plate 20 for vertically positioning in the live bait well 12, and has a fixed center portion 22 and a pair of movable outer portions 24 that are laterally movably mounted to the fixed center portion 22 for engaging the pair of side walls 13 of the live bait well 12, respectively.

The fixed center portion 22 of the plate 20 has a plurality of water throughbores 25 for allowing unaerated water in the live bait well 12 to pass therethrough and be aerated.

The fixed center portion 22 of the plate 20 further has four side portion attaching throughbores 26. Each side portion attaching throughbore 26 extends through the fixed center portion 22 of the plate 20, in proximity of a respective corner thereof.

The fixed center portion 22 of the plate 20 further has a pair of manifold attaching throughbores 28 that are horizontally spaced-apart and centrally disposed.

Each movable outer portion 24 of the plate 20 has a pair of attaching throughslots 30 that are horizontally-oriented and alignable with an associated pair of the four side portion attaching throughbores 26 in the fixed center portion 22 of the plate 20.

The plate 20 further has four side portion attaching screws 32 that pass into the pair of attaching throughslots 30 in each movable outer portion 24 of the plate 20, respectively, then pass into the four side portion attaching throughbores 26 in the fixed center portion 22 of the plate 20, respectively, and then threadably engage four wing nuts 34, respectively, so as to allow the pair of movable outer portions 24 of the plate 20 to be laterally movable relative to the fixed center portion 22 of the plate 20 for engaging the pair of side walls 13 of the live bait well 12, and once the pair of movable outer portions 24 of the plate 20 are engaged with the pair of side walls 13 of the live bait well 12, the four wing nuts 34 are tightened, and in doing so, the plate 20 is maintained vertically in the live bait well 12.

The pump 16 is positioned behind the fixed center portion 22 of the plate 20, has suction cups 36 that depend therefrom for engaging the base 13 of the live bait well 12, and is for inputting and aerating the water passing through the plurality of water throughbores 25 in the fixed center portion 22 of the plate 20.

The pump 16 further has a power cord 38 that extends therefrom to a pair of alligator clips 40 for electrically engaging a boat battery (not shown), The manifold 18 is in fluid communication with the pump 16 and is for conducting the water after being aerated by the pump 16, and comprises a lower elbow 42 that extends horizontally forwardly then vertically upwardly from, and is in fluid communication with, the pump 16.

The manifold 18 further comprises an upright tube 44 that extends vertically upwardly from, and is in fluid communication with, the lower elbow 42 of the manifold 18, along the fixed center portion 22 of the plate 20.

The manifold 18 further comprises a mounting collar 46 that extends around, and captures, the upright tube 44 of the manifold 18, and maintains the upright tube 44 of the manifold 18 against the fixed center portion 22 of the plate 20 by a pair of screws 48 that pass into the mounting collar 46 of the manifold 18, then pass into the pair of manifold attaching throughbores 28 in the fixed center portion 22 of the plate 20, respectively, and then threadably engage a pair of wing nuts 50, respectively.

The manifold 18 further comprises a TEE 52 that extends upwardly from, and is in fluid communication with, the upright tube 44 of the manifold 18 to above the plate 20.

The manifold 18 further comprises a pair of transverse tubes 54 that extend horizontally outwardly from both sides of, and are in fluid communication with, the TEE 52 of the manifold 18, and extend above, and along, the plate 20.

The manifold 18 further comprises a pair of upper elbows 56 that extend horizontally outwardly then downwardly from, and are in fluid communication with, the pair of transverse tubes 54 of the manifold 18, respectively, and extend over the plate 20.

The pair of upper elbows 56 of the manifold 18 are rotatably attached to the pair of transverse tubes 54 of the manifold 18, respectively, for accommodating for the different sized live bait wells 12.

It will be understood that each of the elements described above, or two or more together, may also find a useful application in other types of constructions differing from the types described above.

While the invention has been illustrated and described as embodied in an adjustable aerator for fitting different sized live bait wells, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. An adjustable aerator for fitting different sized live bait wells, wherein the live bait well has a base and a pair of side walls that extend upwardly from the base thereof, said aerator comprising:

a) a mount;
   b) a pump; and
   c) a manifold;

wherein said mount is for positioning in the live bait well;
   wherein said pump is for mounting in the live bait well;
   wherein said manifold is in fluid communication with said pump; and
   wherein said manifold is attached to said mount,
   wherein said mount is a plate;
   wherein said plate is for vertically positioning in the live bait well;
   wherein said plate has a fixed center portion;
   wherein said plate has a pair of movable outer portions;
   wherein said pair of movable outer portions of said plate are laterally movably mounted to said fixed center portions of said plate; and
   wherein said pair of movable outer portions of said plate are for engaging the pair of side walls of the live bait well, respectively.

2. The aerator as defined in claim 1, wherein said fixed center portion of said plate has a plurality of water throughbores; and wherein said plurality of water throughbores in said fixed center portion of said plate are for allowing unaerated water in the live bait well to pass therethrough and be aerated.

3. The aerator as defined in claim 1, wherein said fixed center portion of said plate has four side portion attaching throughbores; and wherein each side portion attaching throughbore extends through said fixed center portion of said plate in proximity of a respective corner thereof.

4. The aerator as defined in claim 1, wherein said fixed center portion of said plate has a pair of manifold attaching throughbores;

wherein said pair of manifold attaching throughbores in said fixed center portion of said plate are horizontally spaced-apart; and
   wherein said pair of manifold attaching throughbores in said fixed center portion of said plate are centrally disposed.

5. The aerator as defined in claim 3, wherein each movable outer portion of said plate has a pair of attaching throughslots;

wherein said pair of attaching throughslots in each movable outer portion of said plate are horizontally oriented; and
   wherein said pair of attaching throughslots in each movable outer portion of said plate are alignable with an associated pair of said four side portion attaching throughbores in said fixed center portion of said plate.

6. The aerator as defined in claim 5, wherein said plate has four side portion attaching screws; and wherein said four side portion attaching screws of said plate pass into said pair of attaching throughslots in each movable outer portion of said plate, respectively, then pass into said four side portion attaching throughbores in said fixed center portion of said plate, respectively, and then threadably engage four wing nuts, respectively, so as to allow said pair of movable outer portions of said plate to be laterally movable relative to said fixed center portion of said plate for engaging the pair of side walls of the live bait well, and once said pair of movable outer portions of said plate are engaged with the pair of side walls of the live bait well, said four wing nuts are tightened, and in doing so, said plate is maintained vertically in the live bait well.

7. The aerator as defined in claim 2, wherein said pump is positioned behind said fixed center portion of said plate;

wherein said pump has suction cups;

wherein said suction cups depend from said pump;

wherein said suction cups of said pump are for engaging the base of the live bait well;

wherein said pump is for inputting the water passing through said plurality of water throughbores in said fixed center portion of said plate; and wherein said pump is for aerating the water passing through said plurality of water throughbores in said fixed center portion of said plate.

8. The aerator as defined in claim 1, wherein said pump has a power cord;

wherein said power cord extends from said pump to a pair of alligator clips; and wherein said pair of alligator clips are for electrically engaging a boat battery.

9. The aerator as defined in claim 4, wherein said manifold is in fluid communication with said pump;

wherein said manifold is for conducting the water after being aerated by said pump;

wherein said manifold comprises a lower elbow;

wherein said lower elbow of said manifold extends horizontally forwardly then vertically upwardly from said pump; and wherein said lower elbow of said manifold is in fluid communication with said pump.

10. The aerator as defined in claim 9, wherein said manifold comprises an upright tube;

wherein said upright tube of said manifold extends vertically upwardly from said lower elbow of said manifold;

wherein said upright tube of said manifold is in fluid communication with said lower elbow of said manifold; and wherein said upright tube of said manifold extends along said fixed center portion of said plate.

11. The aerator as defined in claim 10, wherein said manifold comprises a mounting collar;

wherein said mounting collar of said manifold extends around said upright tube of said manifold;

wherein said mounting collar of said manifold captures said upright tube of said manifold;

wherein said mounting collar of said manifold maintains said upright tube of said manifold against said fixed center portion of said plate by a pair of screws; and wherein said pair of screws of said manifold pass into said mounting collar of said manifold, then pass into said pair of manifold attaching throughbores in said fixed center portion of said plate, respectively, and then threadably engage a pair of wing nuts, respectively.

12. The aerator as defined in claim 10, wherein said manifold comprises a TEE;

wherein said TEE of said manifold extends upwardly from said upright tube of said manifold to above said plate; and wherein said TEE of said manifold is in fluid communication with said upright tube of said manifold.

13. The aerator as defined in claim 12, wherein said manifold comprises a pair of transverse tubes;

wherein said pair of transverse tubes of said manifold extend horizontally outwardly from both sides of said TEE of said manifold, respectively;

wherein said pair of transverse tubes of said manifold are in fluid communication with both sides of said TEE of said manifold;

wherein said pair of transverse tubes of said manifold extend above said plate; and wherein said pair of transverse tubes of said manifold extend along said plate.

14. The aerator as defined in claim 13, wherein said manifold comprises a pair of upper elbows;

wherein said pair of upper elbows of said manifold extend horizontally outwardly then downwardly from said pair of transverse tubes of said manifold, respectively;

wherein said pair of upper elbows of said manifold are in fluid communication with said pair of transverse tubes of said manifold, respectively; and wherein said pair of upper elbows of said manifold extend over said plate.

15. The aerator as defined in claim 14, wherein said pair of upper elbows of said manifold are rotatably attached to said pair of transverse tubes of said manifold, respectively, for accommodating for the different sized live bait wells.

* * * * *